Patented May 13, 1952

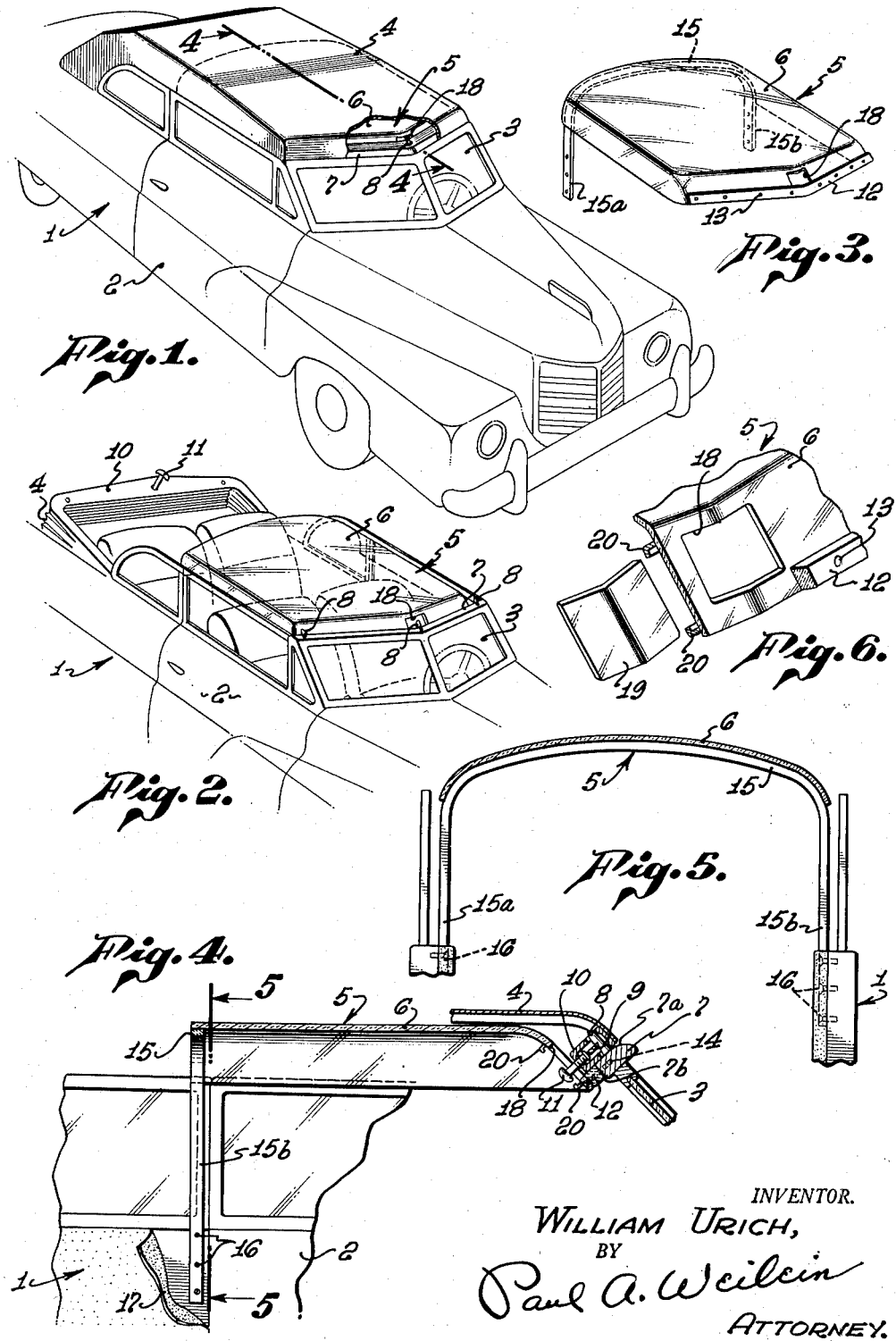

2,596,309

UNITED STATES PATENT OFFICE 2,596,309

SUPPLEMENTAL TOP FOR AUTOMOBILES

William Urich, Whittier, Calif.

Application May 17, 1949, Serial No. 93,683

7 Claims. (Cl. 296—137)

This invention relates to automobile tops; more particularly it relates to a supplemental top for automobiles of the convertible type.

It is an object of this invention to provide a novel automobile top structure.

It is another object of this invention to provide a top structure which will protect the passengers from the wind and sun, at the same time affording the advantages of an open car.

It is another object of this invention to provide such a top structure as an accessory adapted for attachment in a simple and novel manner; and without necessitating alterations in the car body.

It is still another object of this invention to provide, as an attachment for automobiles having a folding top, such for example as those of the type known as "convertibles," a fixed supplemental top structure of material that is transparent but will not permit passage of undesirable light rays, and which will permit operation of the folding top in its usual manner. Thus, the full advantages of the convertible type body are available, at the same time the disadvantages, such as exposure of the passengers to wind and sun, are substantially eliminated.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

In the accompanying drawings:

Figure 1 is a perspective of a convertible automobile with the top in extended position, partly broken away to show the supplemental top of the invention;

Figure 2 is a similar view but showing the top folded;

Figure 3 is a perspective of the supplemental top;

Figure 4 is a fragmentary longitudinal section on an enlarged scale, taken substantially as indicated by line 4—4 of Figure 1;

Figure 5 is a cross section taken substantially as indicated by line 5—5 of Figure 4; and Figure 6 is a detail of a fragment of the supplemental top.

Referring to the drawing, a conventional automobile body of the convertible type is indicated by the numeral 1, and has entrance doors 2 on opposite sides respectively, a windshield 3 and a folding top 4, arranged in a known manner to extend forwardly to the windshield 3 (Figures 1 and 4) or to be folded back (Figure 2). For protecting the passengers against wind and sun glare when the top 4 is folded back, a supplemental top 5 is provided, comprising a canopy-like member 6 of transparent material, for example, a suitable plastic capable of preventing passage of undesirable light rays, such as those producing sunburn.

The top 5 is in the nature of an accessory, being adapted for installation without requiring alteration in the car body 1 or interfering in any way with the usual manipulation of the folding top 4.

A conventional windshield 3 is usually supported on the car body 1 by the aid of a frame having a top rail 7 providing upwardly and downwardly facing inclined rear surfaces 7-a and 7-b (see Figure 4). The upwardly facing surface 7-a has a plurality of bayonet like hooks 8 projecting therefrom engageable by suitable latch mechanism 9 carried by a transverse member 10 at the forward end of the folding top 4 when the top 4 is in extended position, and cooperating therewith to releasably secure the top 4 extended. An element 11 is provided for operating the mechanism 9 optionally to secure and release the top member 10. This arrangement is entirely conventional.

The canopy-like member 6 extends over the body 1 rearwardly from the windshield 3 and is supported just below the position occupied by the top 4 when extended. For this purpose, the forward edge of the member 6 is provided with a reenforcing strip 12 having apertures 13 for accommodating screws 14 which secure the member 6 to the downwardly facing surface 7-b of the windshield top rail 7.

The rear of the member 6 is supported by a transversely arched element 15 having depending legs 15-a and 15-b adjacent the opposite sides of the body 1 respectively and secured thereto in any suitable manner, as by screws 16. To facilitate such attachment, it may be desirable to loosen a portion of the interior upholstery, as indicated by 17, Figure 4, which may be replaced after the element 15 has been secured.

To enable operation of the latching element 11 an opening 18 is provided therefor in the front of the member 6. A flexible plate 19 serves to close the opening 18 when the top 4 is folded, being slidingly accommodated in grooved members 20, and removed when the top 4 is to be secured in extended position.

I claim:

1. In a top structure for an automobile body: a canopy-like member of transparent material adapted to extend rearwardly from the windshield and at least partly over the seats; means for supporting said member above said seats, including means for securing the front edge of said member to the windshield at a point below the point of connection of the regular top of the automobile with the windshield; and supporting members extending upwardly to the rear end of the canopy-like member from the opposite sides of said body.

2. In a supplemental top structure for an automobile body, said body including a foldable top adapted optionally to be extended over the seats to the windshield, the forward end being releasably attached thereto: a canopy-like member of transparent material, an arched member secured at its end to the body and supporting said canopy-like member; said canopy-like member extending over the seats beneath the foldable top, and means for fastening the forward edge of the canopy-like member to the windshield at a point below the connection of the forward end of the foldable top with the windshield.

3. In a supplemental top structure for an automobile body, said body including a foldable top adapted optionally to be extended over the seats to the windshield, said top including mechanism with an operating element for releasably securing the forward end of the top to the windshield; a canopy-like member adapted to extend rearwardly from the windshield over the seat and below the foldable top when extended, and means at opposite ends of said canopy-like member for connection with the windshield and body respectively, there being an access opening in said canopy-like member for said element.

4. In a supplemental top structure for an automobile body, including a windshield having a top rail providing a pair of rear upwardly and downwardly facing inclined surfaces, said body including a foldable top adapted to be extended over the seats with its forward end detachably secured to one of said surfaces: a canopy-like member adapted to extend rearwardly from the windshield over the seats and below the foldable top when extended; means detachably securing the forward end of said member to the other of said surfaces; and members connected with the body for supporting the rear end of said canopy-like member.

5. In a supplemental top structure for an automobile body, including a windshield having a top rail providing a pair of rear upwardly and downwardly facing inclined surfaces, said body including a foldable top adapted to be extended over the seats; said top including mechanism with an operating elements for releasably securing the forward end of the top to the upwardly facing surface of said pair; a canopy-like member adapted to extend rearwardly from the windshield over the seats and below the foldable top when extended; means detachably securing the forward end of said member to the downwardly facing surface of said pair; and means supporting the rear end of said member, there being an access opening in said member for said element.

6. The combination with a motor vehicle having a windshield, a foldable top, means for detachably connecting the top to the windshield, and an operating member for said connecting means; of a supplemental top extending in a plane below that occupied by the foldable top when the latter is in position of use, means for fastening the forward edge of the supplemental top to the windshield at a point thereon below the point of connection of the foldable top with the windshield, and an arched member connected with the vehicle body for supporting the supplemental top at a point rearwardly of the windshield.

7. The combination with a motor vehicle having a windshield, a foldable top, means for detachably connecting the top to the windshield, and an operating member for said connecting means; of a supplemental top extending in a plane below that occupied by the foldable top when the latter is in position of use, means for fastening the forward edge of the supplemental top to the windshield at a point thereon below the point of connection of the foldable top with the windshield, and upright members on the vehicle body connected with and supporting the supplemental top at a point rearwardly of the windshield, said supplemental top having an opening at its forward end affording access to said operating member.

WILLIAM URICH.

REFERENCES CITED

The following references are of record in the file of this patent:

UNITED STATES PATENTS

| Number | Name | Date |
| --- | --- | --- |
| 1,438,195 | Thomas | Dec. 12, 1922 |
| 1,778,356 | Coppock | Oct. 14, 1930 |
| 1,826,922 | Carr | Oct. 13, 1931 |
| 2,043,672 | Morrison | June 9, 1936 |
| 2,463,646 | Schassberger | Mar. 8, 1949 |
| 2,479,825 | Tleischhauer | Aug. 23, 1949 |

FOREIGN PATENTS

| Number | Country | Date |
| --- | --- | --- |
| 615,738 | France | Jan. 14, 1927 |

OTHER REFERENCES

Publication Ford Field, p. 39 Sept. 1946.